United States Patent [19]

Tamblyn et al.

[11] Patent Number: 4,727,050
[45] Date of Patent: Feb. 23, 1988

[54] SUPPORTED CATALYST

[75] Inventors: William H. Tamblyn, Wilmington, Del.; Edward Rosenberg, Northridge, Calif.; Donald H. Picker, Narberth, Pa.; Michael W. Lord, Northridge, Calif.

[73] Assignee: Johnson Matthey, Inc., Malvern, Pa.

[21] Appl. No.: 667,442

[22] Filed: Nov. 1, 1984

[51] Int. Cl.⁴ .................. B01J 31/12; B01J 31/08; B01J 31/06
[52] U.S. Cl. ..................... 502/159; 525/370; 556/136
[58] Field of Search ............ 502/159; 525/370; 260/429 R; 556/136

[56] References Cited

U.S. PATENT DOCUMENTS

| 3,201,376 | 8/1965 | Osborn et al. | 525/370 |
| 3,476,532 | 11/1969 | Hartman | 525/370 |
| 4,306,085 | 12/1981 | Kim et al. | 502/159 |

FOREIGN PATENT DOCUMENTS 163156 12/1981 Japan ..................... 525/370

Primary Examiner—Paul E. Konopka
Attorney, Agent, or Firm—Cushman, Darby & Cushman

[57] ABSTRACT

A catalyst composition comprising a PGM complex bound to a carboxylated polymer containing not more than 5 mol equivalents of carboxylate groups per gram of polymer.

5 Claims, 1 Drawing Figure

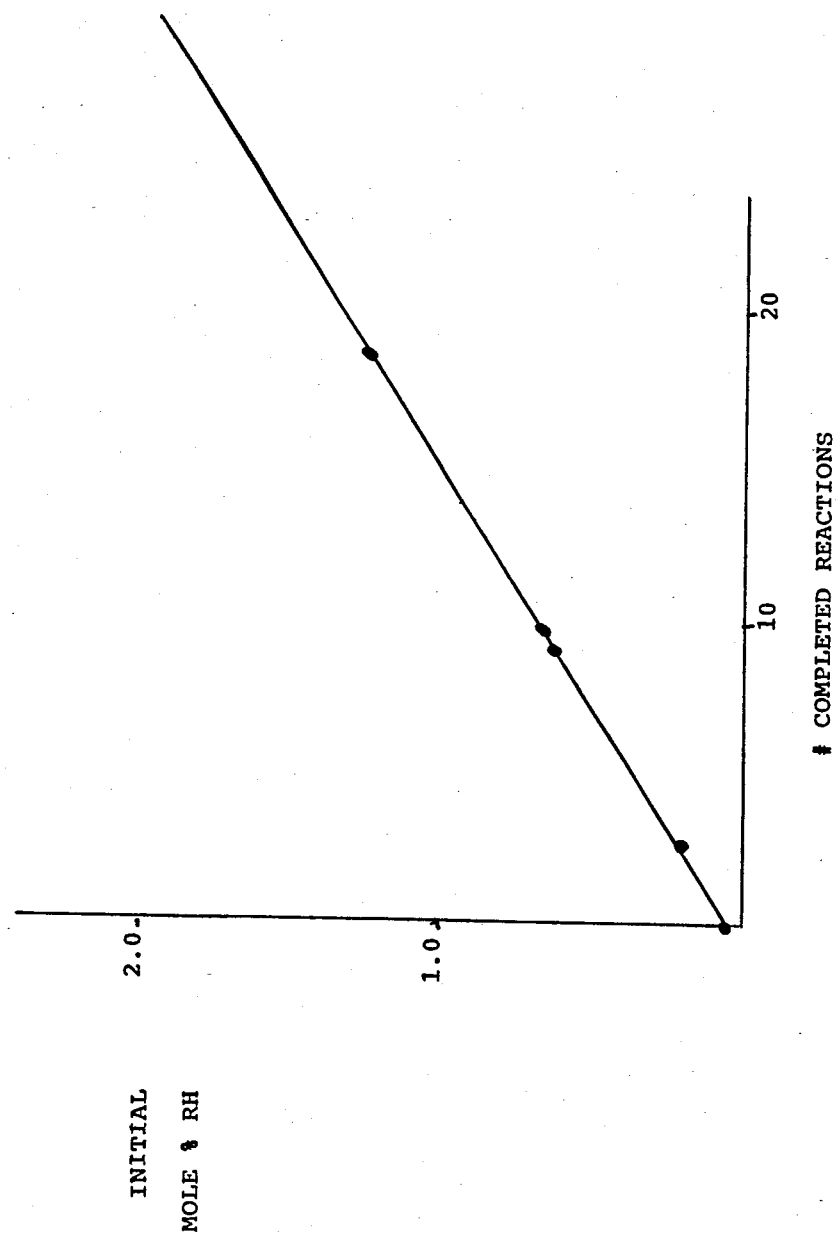

SUPPORTED CATALYST

The present invention relates to certain novel catalyst compositions, their preparation and use.

More particularly, the invention is concerned with platinum group metal (PGM) catalysts, which are anchored to carboxylate polymers. It has been found that such polymer-bound catalysts not only retain the catalytic activity of the unbound ("homogeneous") metal complex but also demonstrate substantially longer effective lifetimes.

Platinum group metals (PGM), and their organic complexes, e.g., their carboxylates such as $Rh_2(OAc)_4$, are well known catalysts for use in various types of reactions such as the cyclopropanations, hetero atom-hydrogen insertions, hydroformylation, hydrogenation, aryl-vinyl and aryl-allyl coupling reactions. These catalysts, for example, the carboxylates, may be used in a form which is either soluble or insoluble in the reaction medium. Frequently the PGM complex is supported on an appropriate carrier material for contact with the reactant or reactants involved.

While various different combinations of PGM complexes and supports have been proposed, there is still considerable room for improvement in the area of supported PGM catalysts, particularly with respect to catalyst life, overall efficiency, separation of product from catalyst, etc.

The principal object of the present invention is to provide an improved catalyst composition comprising a PGM complex wherein the complex, or the metal thereof, is supported in a new and highly effective way. Other objects will also be apparent.

Broadly speaking, the catalyst composition of the invention comprises a PGM complex, e.g., rhodium acetate or octanoate, anchored to a carboxylated polymer. It is not completely clear whether the complex itself or the metal component is anchored to the polymer. However, it is evident that the catalytic component of the complex is somehow effectively anchored to the polymer via the carboxylate groups of the polymer.

Any catalytically active PGM complex, or mixtures thereof, may be used for present purposes. The amount of PGM complex so employed can be varied and will depend, inter alia, on the use contemplated, and the polymer and complex involved. In any event, the amount used should be sufficient to provide the desired catalytic activity. Usually amounts in the range of 0.2 to 5% by weight of metal, based on the total weight of the catalyst composition (PGM and polymer), can be used although amounts outside this range may also be used.

BRIEF DESCRIPTION OF THE DRAWING

The FIGURE shows how catalyst lifetime increases linearly with the amount of rhodium present in the catalyst.

Any polymer, thermoplastic or thermosetting, which has free carboxylic acid or carboxylate groups (all hereinafter embraced by the terms "carboxylate" or "carboxylated"), may be used for anchoring the PGM complex, provided the polymer does not include other reactive substituents which would complicate the desired anchoring and/or interfere with the reaction in which the catalyst is to be used. Typically suitable polymers include carboxylated polymers of vinyl monomers such as styrene, vinyl acetate or like esters, acrylics or methacrylics such as acrylic or methacrylic acid, etc. The polymers may be homopolymers or copolymers including, for example, terpolymers, linear or branched, block or otherwise provided they include available carboxy or carboxylate groups in sufficient amount to anchor the PGM or complex thereof. The number of carboxy groups involved may be varied over a large range and will apparently depend, at least to some extent, on the PGM complex which is involved, the nature of the polymer and the use contemplated for the resulting polymer-bound complex. Usually, however, something in the order of about 1.0 to 3.5 mol equivalents (Meq) of carboxylate per gram of polymer have been most successful for present purposes. On the other hand, polymers containing 5 Meq or more carboxylate per gram of polymer have shown no significant reactivity to date.

As specific examples of carboxylated polymers for use herein there may be mentioned "Surlyn" which is a copolymer of sodium or zinc salt of acrylic acid, and ethylene. Apparently this polymer is prepared as an acrylonitrile-ethylene copolymer which is subsequently partially hydrolyzed to give sodium (or zinc) carboxylate side chains.

Other specific examples of suitable polymers for use herein are "Nucrel", a copolymer of free acrylic acid and ethylene; and carboxylated polystyrene. The polymer known as "Sybron" CNN, a lightly cross-linked polystyrene carrying carboxy groups on the phenyl rings, may also be used to anchor PGM complexes e.g., rhodium acetate, although this combination does not appear to be particularly effective as a catalyst, apparently because of the presence of too many carboxy groups (i.e. more than 5 Meq.) which result in undesired crosslinking when the complex is reacted with the polymer. It appears that, for most effective catalytic results, the number of carboxylate groups, present as free carboxylic acid groups or as metal carboxylate groups, should be kept below a critical limit. This will vary depending on, for example, the polymer and complex employed. However, as noted, the presence of carboxy groups in the range of 1.0 to 3.5 Meq per gram of polymer should give the most effective anchoring, catalytic activity and catalyst lifetime.

The PGM complex used herein may be, for example, any PGM carboxylate which by itself has catalytic activity. For example, effective results can be obtained using a rhodium carboxylate of the formula:

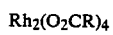

$$Rh_2(O_2CR)_4$$

where R is alkyl of 1-12 carbons, e.g., methyl, ethyl, propyl, octyl, etc. Useful results are also obtained with other analogous PGMs, e.g., palladium, platinum and ruthenium.

The complex may be conveniently bound or anchored to the polymer by refluxing a solution of the complex, preferably but not necessarily a saturated solution, with the polymer in bead or other particulate form. The amount of complex so anchored to the polymer is directly proportional to the length of time the polymer beads or particles are refluxed with the solution of PGM complex. As refluxing is continued, the beads become progressively harder and opaque as more of the metal complex is anchored. Washing or extraction (for example, sohxlet extraction to remove sodium acetate liberated by the polymer) show no detectable leaching or removal of the catalyst from the polymer support.

It will be appreciated that a wide variety of temperatures and solvents may be used to anchor a particular catalyst complex to a polymer support and the optimum temperature and solvent in any case will depend on the specific polymer and complex involved. However, in any case, once the complex is anchored, the catalyst lifetime is substantially extended beyond that of the unsupported (homogeneous) catalyst.

It has been found that a given PGM complex may show different catalytic activities on different polymer materials. Hence, some experimentation may be necessary in any specific case to optimize the activity of a particular PGM complex when bound to polymer according to the invention.

Preferred catalyst compositions according to the invention include $Rh_2(OAc)_4$ anchored to either "Nucrel" polymer or carboxylated polystyrene. These compositions demonstrate catalytic activity comparable to that of the unsupported (homogeneous) $Rh_2(OAc)_4$ but have substantially longer catalyst lifetimes.

Another preferred polymer-bound catalyst composition according to the invention involves the use of polymer of the "Surlyn" type. One such polymer is an acrylonitrile-ethylene copolymer which is partially hydrolyzed subsequent to polymerization to give sodium carboxylate side chains. This polymer has been found to provide an excellent matrix or support for anchoring a PGM carboxylate, e.g., rhodium acetate or octanoate. A representative catalyst composition comprising "Surlyn" can be prepared by refluxing rhodium acetate and "Surlyn" polymer. This composition has been shown to give yields 20-30% higher than the rhodium acetate alone (i.e. the "homogeneous" catalyst) under the same conditions.

It will be appreciated that the PGM carboxylate or like complex which is bound to polymer according to the invention can be suitably selected for the catalytic use which is contemplated. Thus, the invention contemplates custom designing catalyst systems by appropriate selection of the PGm complex, and, in some instances, the polymer substrate to meet particular reaction requirements. Thus, in its broadest aspect, the invention contemplates catalyst compositions comprising a PGM carboxylate bound to a carboxylated polymer and, in its more specific aspects, specifically designed combinations of particular PGM carboxylates bound to selected carboxylated polymers intended to meet specialized reaction needs and requirements.

Generally speaking, the polymer-bound PGM catalyst compositions of the invention provide catalytic activity at least equivalent to the homogeneous or unbound PGM complex used by itself. However, as noted, the present catalyst compositions offer the advantage of longer catalytic life and may, therefore, be re-used without significant loss of activity. The polymer-bound compositions alone can be separated out more readily from the reaction mixture with consequent better recovery of the desired reaction product.

The catalyst compositions of the invention may be used to catalyze any reactions where the PGM carboxylate itself could otherwise be effectively used. One advantageous use of these catalysts is for the catalysis of diazoester decomposition in cyclopropanation. It is known, for example, that ethyl vinyl ether ($CH_2CHOEt$) can be cyclopropanated with $=CHCO_2Et$ generated by the rhodium acetate-catalyzed decomposition of ethyl diazoacetate. This type of reaction has found widespread use in cyclization and X-H insertions (where X is S, P or N) and its industrial application is well-recognized.

The catalysis of diazoester decompositions using metal complexes in previously known manner is relatively rapid and smooth, even at room temperature (20°–25° C.). However, reaction of the carbene with itself gives fumarates and maleates in undesirably significant amounts. Additionally, the reaction mixture must be filtered over alumina and recovery of active catalyst in these known processes is poor.

The polymer bound catalyst compositions of the present invention, in contrast, provide essentially the same advantages of the previously used catalyst forms while minimizing undesired production of fumarates and maleates. As indicated, the present catalyst also has the advantage that it can be readily recycled and reused and its recovery from the reaction mixture is relatively straightforward and simple.

The invention is illustrated, but not limited, by the following examples wherein the cyclopropanation of ethyl vinyl ether with $=CHCO_2Et$ generated by the catalyzed decomposition of ethyl diazoacetate, is used as a model reaction.

EXAMPLE 1

Preparation of Polymer (Surlyn 0894) Anchored Rhodium Carboxylates

A solution of $Rh_2(O_2CCH_3)_4$ [2.5 g in 250 ml EtOH] was refluxed with Surlyn 0894L polymer beads for periods of 1-7 days. All beads were then washed with cold ethanol and then sohxlet extracted with ethanol for three days. There was no sign of metal formation, even after the 7-day reflux with rhodium acetate. Rhodium octanoate, however, showed extensive decomposition to metal after 3-4 days of reflux in ethanol, giving beads coated with a rhodium mirror. Longer reflux times led to heavier metal loadings and harder, but less swellable beads. The beads used in the catalytic studies referred to in Example 2 were refluxed with rhodium acetate for three days.

EXAMPLE 2

Reaction of Ethyl diazoacetate with Ethylvinyl Ether Catalyzed by Anchored Rhodium Acetate 2.5 g of Surlyn-$Rh_2(O_2CCH_3)_4$ beads prepared as in Example 1 and 5.0 ml (0.048 mmole) ethylvinyl ether and 50 ml $CH_2Cl_2$ were combined in a 200 ml Schlenk tube fitted with a magnetic stir bar. 5.0 ml (0.047 mmole) ethyl diazoacetate was then rapidly added and the reaction was stirred at room temperature for 24-27 hours. The reactions were monitored by infrared spectroscopy using the disappearance of the diazo stretch at 2200 cm$^{-1}$ as evidence of complete reaction. The reaction solution went from bright yellow to clear or pale yellow upon completion. The reaction solution was then poured away from the catalyst beads, rotary evaporated and then vacuum distilled to give 4.2–4.9 g at 80°–94° C./18 mm (0.034–0.038 mmole, 72–79%) of (E+Z)-1-ethoxy-2-carboethoxy cyclopropane characterized by its $^1$H-NMR (E:Z=1.5:1). The reaction was repeated nine times, using the same beads with no detectable loss of activity or reduction in yield. The reaction was slower in benzene, toluene, or diethyl ether, but the yields were comparable (see Table I).

TABLE I

Comparison of Homogeneous and Polymer Bound $Rh_2(O_2CCH_3)_4$ for the
Reaction: $N_2CHCO_2Et + CH_2CHOEt \rightarrow$ Cyclopropanation

| CATALYST | SOLVENT | REL RATE | ISOLATED YIELD % | (E:Z) ISOMER RATIO | Rh [MOLE %] | REMARKS |
|---|---|---|---|---|---|---|
| (A) $Rh_2(O_2CCH_3)_4$ | $CH_2Cl_2$ | 1 | 40–50 | — | 0.1 | >5% Maleate & fumarate 1:1 reactants |
| (B) $Rh_2(O_2CCH_3)_4$ | $Et_2O$ | 0.5 | 45–50 | — | 0.1 | >5% Maleate & fumarate 1:1 reactants |
| (C)* $Rh_2(O_2CCH_3)_4$ | $Et_2O$ | 0.08 | 75 | 1.6 | 0.1 | 1:1 reactants, syringe pump |
| (D) Polymer Bound $Rh_2(O_2CCH_3)_4$ | $CH_2Cl_2$ | 0.05 | 70–79 | 1.5 | 0.10 | <3% Maleate Beads cycle nine times |
| (E) Polymer Bound $Rh_2(O_2CCH_3)_4$ | $Et_2O$ | 0.013 | 70 | — | .2–.3 | <1% Maleates |
| (F) Polymer Bound $Rh_2(O_2CCH_3)_4$ | $CH_3C_6H_5$ 80° C. | 0.33 | <40 | — | .2–.3 | Beads ruptured >5% Maleates |

*Data taken from the literature for this test. See M. P. Doyle et al, Synthesis, page 787 (1981).

The results set out in Table I show that the polymer bound PGM complex used at room temperature (Tests D & E) gave significantly higher yields and lower maleate/fumarate formation than obtained with the homogeneous catalyst (Tests A and B) under comparable conditions. The yield in Test C using the homogenous catalyst was comparable with that obtained in Tests D and E but, to achieve this, it was necessary to add the ethyl diazoacetate slowly by means of a syringe pump.

Test D also shows that the polymer bound catalyst can be reused (nine times) while maintaining a high yield. No loss of activity or yield reduction was noticed even after reusing the beads of Test D nine times. Some discoloration of the beads was noted after five–six cycles but studies showed only slight decomposition of the catalyst and, as noted, no significant change in the yield.

The results obtained with the polymer bound catalyst in Test F were less favorable than with Tests D and E. However, this could be due to a variety of factors including the use of a higher reaction temperature (80° C. compared to room temperature) and a different solvent. In any case, the overall results shown in Table I clearly demonstrate the feasibility of carboxylate anchoring and that the overall performance of polymer bound catalysts of the invention is better than their homogenous counterparts.

EXAMPLE 3

A Nucrel-rhodium acetate complex was prepared for comparison with the analogous Surlyn-rhodium acetate system of Example 1. The Nucrel-bound catalyst was prepared by refluxing Nucrel (20 grams) with an ethanol solution of rhodium acetate (2.5 grams in 200 absolute ethanol) for 30 hours. This appeared to give a much higher loading of catalyst onto the Nucrel and a deeper penetration into the bead when compared to Surlyn as evidenced by color enhanced microscopy. This higher permeability and apparently higher metal loading was reflected in a much higher rate of catalysis for the model reaction (Table II). Catalyst lifetime was significantly longer than that of the Surlyn catalyst under analogous conditions and the yields and amounts of side products were comparable (70–75% isolated products, <5% side products).

EXAMPLE 4

A series of experiments were conducted using various $Rh_2(OAc)_4$-Surlyn combinations prepared as in Examples 1 and 2 to determine the effect of varying the initial amount of complex on catalytic activity and catalyst lifetime. In these experiments, the model reaction was again used. The initial concentration of reactants was kept constant and the amount of polymer-bound catalyst was varied. At 0.05 mole % Rh, 80% conversion was realized in a 20 hour reaction time and the catalyst was inactive in the second cycle. This was not surprising in view of the fact that the homogenous (unsupported) catalyst was completely decomposed at 0.1% Rh although 100% conversion was realized. Although the nature of this decomposition reaction is not understood, both the homogeneous and the polymer bound rhodium acetate turn from blue-green to yellow on loss of activity.

As the amount of polymer-bound catalyst was increased from 0.05 mole % Rh (0.2 gram beads) to 0.2% (0.8 grams), 0.6% (2.5 grams and 1.3% (5.0 grams), only a slight increase in the rate of the reaction was noted (less than a factor of two). However, a substantial and linear increase in the catalyst lifetime as measured by the number of completed reactions was realized. This is shown in FIG. 1 which plots initial amount of Rh complex versus number of times the catalyst was re-used. These results show that the lifetime of the polymer-bound catalyst is substantially longer than that of the homogeneous catalyst. Furthermore, since only slight increases in rate are observed over a twenty-six fold increase in mole % of catalyst, it is evident that the reaction is not significantly dependent on available surface area of the polymer-bound catalyst.

Catalyst lifetime appears to be governed by the number of catalytic sites destroyed. For the reactions run with 0.2 mole % rhodium, the amount of leaching of Rh over 9 reactions was 62% of the total metal present or an average of 6.5% per cycle, as evaluated by metal analysis. Since the catalyst lasted for 9 reactions the loss of active catalyst averages to about 11% per cycle, showing that the bead retained almost half of the destroyed catalyst and that loss of activity was not due to simple leaching of absorbed rather than anchored catalyst.

EXAMPLE 5

Ru$_2$(OAc)$_4$ was synthesized in known fashion from RuCl$_3$.3H$_2$O. The preparation gave low yields which could be improved by addition of KCL to the reaction mixture. The resulting brown complex was slightly soluble in tetrahydrofuran (THF). Stirring the solution (1.0 gram in 300 ml THF) with Surlyn for 1 week gave dark brown beads which were extracted with THF and then tested as a catalyst in the model reaction illustrated in Example 2. The catalyst was found to be sightly slower than the combination of rhodium acetate-Surlyn. However, the catalyst gave clear reaction solutions and comparable yields to other catalysts according to the invention. The preparation of the rhodiumacetate-Surlyn combination gave a better catalyst yield than the ruthenium-Surlyn reaction, the latter reaction being somewhat unreliable. However, the ruthenium-Surlyn combination was effective as a catalyst in the model reaction.

EXAMPLE 6

This example describes the synthesis and testing of carboxylated polystyrene-rhodium acetate.

Initial efforts to obtain an active cyclopropanation catalyst on polystyrene ("Sybron") failed. This was attributed to possible overloading of the Sybron polymer which contains a relatively large number of COOH groups (10.0 Meq COOH/G) resulting in crosslinking of the polymer by the metal complex. In view of this, an effort was made to load the polymer beads more lightly by stirring the solutions of rhodium acetate at room temperature with the beads instead of refluxing TFA or ETOH solutions of rhodium acetate with the polymer beads. However, even these more lightly loaded beads proved to be inactive. Accordingly, carboxylated polystryrene was synthesized which contained fewer Meq COOH/g than "Sybron". To do this, Aldrich polystyrene was litheated (3.0 G, 50 ML cyclohexane) with N-Bu-Li (TMEDA) (15 ml 2.6M N-Bu-Li in hexane+5 ml TMEDA). The resulting red-brown polymer was then washed with cyclohexane, then THF and carboxylated by bubbling carbon dioxide through a THF suspension of the polymer. Half of this batch (1.5 g) was acidified with excess HCL (1.0 m, 20 ml) and back titrated NAOH (1 m). In two separate experiments, there were obtained polystyrene polymers containing 2.3 and 2.7 Meq COOH/g. Stirring both the acidified and unacidified resins with a THF solution of rhodium acetate (1.0 g in 50 ml THF) gave light green resins with the acidified resin having a much more powdered appearance than the unacidified resin which retained more of its beadlike appearance. The catalytic activity of both of these resins was outstanding as shown in Table II. Both catalysts were almost as fast as the homogeneous catalyst and appeared to have catalyst lifetimes at least as long as the Surlyn and Nucrel-rhodium acetate catalysts. Surprisingly, the beads changed color from light-green to light-brown during the reaction and then went back to green after the reaction was finished.

EXAMPLE 7

Palladium acetate-Surlyn and palladium acetate-Nucrel combinations were also synthesized and tested. Palladium acetate is an important industrial catalyst finding use in oxo-processes, as well as aryl-vinyl and aryl-allyl coupling reactions. The acetate itself is a trimer in the solid which dissociates to a monomer in coordinating solvents. It is this monomer which is thought to be the catalytically active species. The polymer bound composition was prepared by refluxing ethanol solutions of palladium acetate (2.5 gram in 200 ml) with either Nucrel or Surlyn. It was found that this led to rapid (<10 minutes) decomposition of the acetate complex to palladium metal, resulting in the deposition and anchoring of a palladium metal mirror on the polymer beads.

Stirring a THF solution (2.5 gram in 200 ml) of the acetate complex at room temperature for 24 hours resulted in the formation of deep orange beads for both Surlyn and Nucrel. The Nucrel beads seemed more heavily loaded (by weight difference before and after treatment with the complex) and in fact were split and blistered by the anchoring process. It is noted that rhodium acetate does not give significant anchoring under the conditions used herein to anchor the palladium acetate. This indicates a greater liability of the acetate ligands on palladium towards displacement by polymer bound carboxylate groups.

The catalytic activity and catalyst lifetime for the palladium acetate-Surlyn were found to be comparable to those of rhodium acetate (see Table II). The Nucrel supported catalyst was slightly faster than the Surlyn catalyst (Table II). These palladium catalysts gave dark turbid solutions and the I.R. evidence indicated that larger amounts of maleates and fumarates were formed than with Rh$_2$(OAc)$_4$. The beads darkened considerably with each reaction and earlier cycles produced small amounts of metal during the course of reaction. Overall the rhodium analogues appear to give better results than the polymer bound palladium catalysts of the invention. Nevertheless, the results obtained with the palladium catalysts show the feasibility of anchoring palladium acetate and indicate that the thus anchored catalyst has kinetically accessible catalytic palladium sites.

Test reactions were conducted using the various polymers exemplified above, namely Surlyn, Nucrel, polystyrene and carboxylated polystyrene, without the addition of the PGM complex, to see if the polymers themselves were also acting catalytically. Analytical scale reactions were run with these polymers and the reactants used in Example 2, i.e., ethyl diazoacetate and ethyl vinyl ether (0.01 mole diazoacetate, 0.01 mole ethyl vinyl ether and 20 ml CH$_2$Cl$_2$). No diazoester decomposition or product formation were noted by infrared spectroscopy. Analytical scale reactions referred to herein (0.01 mole diazoacetate, 0.01 mole ethylvinyl ether, 20 ml CH$_2$Cl$_2$) were monitored by infrared spectroscopy. Appearance of a carbonyl band at 1725 CM-1 is indicative of cyclopropanation while disappearance of the diazo band at 2200 CM-1 indicates complete diazoester decomposition. Relative amounts of side products (maleates and fumarates) were estimated by the intensity of the C=C stretch at 1600 CM-1. Simple acid promoted decomposition of the diazoester was ruled out in these reactions on the basis of the IR data and since all experiments were repeated on a preparative scale at least once (0.05 moles reactants, 100 ml CH$_2$Cl$_2$) to evaluate isolated product yields and actual yields of side products.

Table II below shows the relative rates and catalyst lifetimes for polymer supported carboxylate catalysts according to the invention (Tests H, I, K–0) in comparison with other catalysts not in accord with the invention (Tests G and J).

reactivity observed could be due to leaching of active catalyst from the polymer or to changes in active site

TABLE II

| CATALYST | SUPPORT | REL. RATE | CYCLES* | METAL INIT. MOLE % |
|---|---|---|---|---|
| $Rh_2(OAc)_4$ (G) | Homogeneous | 1.0 | 1 | 0.2 |
| $Rh_2(OAc)_4$ (H) | Surlyn | 0.01 | 30 | 0.2–0.3 |
| $Rh_2(OAc)_4$ (I) | Nucrel | 0.2 | >30 | 0.6 |
| $Rh_2(OAc)_4$ (J) | Sybron —CNN, CC Polystyrene (10 meq($CO_2H$)/g | Inactive | — | — |
| $Rh_2(OAc)_4$ (K) | Polystyrene (2.5 meq($CO_2H$)/g | 0.5 | >20 | 0.6 |
| $Rh_2(Octanoate)_4$ (L) | Surlyn | 0.05 | 9 | 0.2 |
| $[Pd(OAc)_2]_3$ (M) | Surlyn | 0.01 | 9 | 10.0 |
| $[Pd(OAc)_2]_3$ (N) | Nucrel | 0.03 | >20 | 6.0 |
| $[Ru_2(OAc)_4]$ + (O) | Surlyn | <0.01 | 8 | 0.70 |

*Wherever a greater than (>) is given, the catalyst was still active and still being cycled when the data was tabulated The polymer supported catalysts referred to in Table II were prepared as shown in the foregoing examples. The much longer lifetimes of the present catalysts are evidenced from the "Cycles" column of Table II.

The FIGURE graphically shows, by plotting the number of completed reactions, i.e., recycles, against the amount of catalyst initially present, how catalyst lifetime, using rhodium acetate bound to Surlyn for purposes of illustration, increases linearly with the amount of catalyst (Rh) initially present in the catalyst.

EXAMPLE 8

Studies

Experimental Procedures

To 40.0 g Nucrel 960 loaded with rhodium acetate (analyzed as 0.6% by weight rhodium) in 200 ml methylene chloride containing 0.45 moles ethyl vinyl ether, was added dropwise, 0.45 moles of ethyl diazo acetate in 10 ml methylene chloride, over a 10 minute period with magnetic stirring. Infrared spectra were taken on aliquots of the reaction solution every fifteen minutes until the reaction was complete, as determined by the disappearance of the diazo stretch at 2200 cm-1. After reaction was complete the reaction solution was decanted from the catalyst, flash evaporated and vacuum distilled to yield pure cyclopropane product. This procedure was repeated twenty times using the same beads, and a 0.5 g sample of the catalyst was removed after each cycle for metal analysis. The 0.6% by weight metal corresponds to 0.6 mole % metal initially present for this reaction system.

Results and Discussion

The yield of cyclopropane remained constant throughout all twenty cycles at 68–70%. A side by side reaction using 0.2 mole % of the homogeneous catalyst $[Rh_2(OAc)_4]$ gave only a 60% yield under exactly the same conditions, and no reusable catalyst was recovered after alumina filtration of the reaction mixture. There was some loss in reactivity of the catalyst from cycle to cycle. In cycles 1–5, the reaction was over in 30 minutes or less. For the twentieth cycle 105 minutes were required for complete reaction although the yield remained unaffected. This loss in reactivity is not significant in a practical sense, when one realizes that the same overall amount of metal can be used twenty times over compared with the homogeneous catalyst. Furthermore, loss in reactivity diminished after fifteen cycles with the reaction time remaining constant from cycles 15–20. The beads were still active and appeared relatively unchanged in appearance. The slight loss in reactivity observed could be due to leaching of active catalyst from the polymer or to changes in active site accessibility arising from changes in the matrix. Metal analysis of samples withdrawn from the reaction system after cycles 1, 5, 10, 15 and 20 have been done. With other catalyst systems analyzed (e.g.-$RH_2(OAc)_4$-Surlyn, $Pd(OAc)_2$-Surlyn) about 5% by weight of total metal present is leached per cycle. The $Rh_2(OAc)_4$-Nucrel systems show even lower leaching rates based on these results. Extrapolation of the data to 0.1% predicts that the catalyst would last 38–40 cycles before going inactive. An average loss of 2.3% of metal initially present is lost per cycle.

Finally, aliquots removed from the reaction system and held in a syringe for fifteen minutes showed the same peak intensities as samples where spectra were run directly after removal of the aliquot (successive runs). This strongly suggests that catalysis occurs at the anchored complex and not by catalyst leached into the solution.

It will be appreciated that various modifications may be made in the invention as described above. Accordingly, the scope of the invention is defined in the attached claims wherein:

We claim:

1. A catalyst composition comprising a catalytic platinum group metal carboxylate bound to a carboxylated polymer through the carboxylate group of the polymer, the carboxylate group being the only essential reactive group in the polymer and the polymer containing not more than 5 mol equivalents of carboxylate groups per gram of polymer.

2. A composition according to claim 1 wherein the platinum group metal carboxylate is rhodium acetate.

3. A composition according to claim 2 wherein the polymer is a carboxylated styrene-acrylic copolymer or carboxylated polystyrene.

4. A method of preparing the catalyst composition of claim 1 comprising refluxing a solution of the platinum group metal carboxylate with the polymer in particulate form until the catalytic component of the carboxylate is bound to the polymer through the carboxylate groups of the polymer and thereafter recovering the resulting product.

5. A catalyst according to claim 1, said catalyst being obtained by refluxing a solution of the platinum group metal carboxylate with the polymer in particulate form until the catalytic component of the carboxylate is bound to the polymer through the carboxylate groups of the polymer and thereafter recovering the resulting product.

* * * * *